(12) United States Patent
Krogue et al.

(10) Patent No.: US 7,662,291 B2
(45) Date of Patent: Feb. 16, 2010

(54) CANISTER FOR TREATMENT OF CONTAMINATED FLUIDS

(75) Inventors: John A. Krogue, Mineral Wells, TX (US); Daniel Cloud, Granbury, TX (US); James McQuaid, Mineral Wells, TX (US)

(73) Assignee: Perry Equipment Corporation, Mineral Wells, TX (US)

( * ) Notice: Subject to any disclaimer, the term of this patent is extended or adjusted under 35 U.S.C. 154(b) by 0 days.

(21) Appl. No.: 11/731,230

(22) Filed: Mar. 30, 2007

(65) Prior Publication Data

US 2007/0262025 A1    Nov. 15, 2007

Related U.S. Application Data

(60) Provisional application No. 60/787,949, filed on Mar. 31, 2006.

(51) Int. Cl.
*C02F 1/42* (2006.01)
(52) U.S. Cl. .................................................. 210/688
(58) Field of Classification Search .................. 210/688
See application file for complete search history.

(56) References Cited

U.S. PATENT DOCUMENTS

| | | | | |
|---|---|---|---|---|
| 5,057,368 | A * | 10/1991 | Largman et al. | 428/397 |
| 6,887,381 | B2 * | 5/2005 | Rohrbach et al. | 210/502.1 |
| 7,008,471 | B2 * | 3/2006 | Koyama et al. | 96/131 |
| 7,144,445 | B2 * | 12/2006 | Gueret et al. | 95/96 |
| 7,393,381 | B2 * | 7/2008 | Tower et al. | 95/8 |
| 2001/0042440 | A1 * | 11/2001 | Miyazawa et al. | 95/139 |
| 2002/0020292 | A1 * | 2/2002 | Wojtowicz et al. | 95/116 |
| 2003/0181561 | A1 * | 9/2003 | Li et al. | 524/425 |
| 2005/0205469 | A1 * | 9/2005 | Klabunde et al. | 208/208 R |
| 2007/0071657 | A1 * | 3/2007 | Okubo et al. | 422/186.03 |
| 2008/0099375 | A1 * | 5/2008 | Landau et al. | 208/244 |

FOREIGN PATENT DOCUMENTS

EP    632120 A2 *    1/1995

OTHER PUBLICATIONS

Richardeau, D., et al., "Adsorption and reaction over HFAU zeolites of thiophene in liquid hydrocarbon solutions," Applied Catalysis A: General, vol. 263, Issue 1, May 28, 2004, pp. 49-61.*
PCT International Search Report based on PCT/US07/08243 dated Jul. 24, 2008.

* cited by examiner

*Primary Examiner*—Chester T Barry
(74) *Attorney, Agent, or Firm*—Chinh H. Pham; Greenberg Traurig, LLP

(57) ABSTRACT

An apparatus for use in the treatment of contaminated fluid is provided. The apparatus includes an outer element into which contaminated fluid flows and an inner element positioned in substantial axial alignment within the outer element and in spaced relations thereto. The apparatus also includes, between its ends, a pathway defined by an interior surface of the inner element and along which treated fluid may be directed out from the apparatus. A waste nanoadsorbent material can be provided between the outer element and the inner element, for use in removing contaminants within the fluid flowing through the apparatus. A method for the treatment of contaminated fluid is also provided.

52 Claims, 3 Drawing Sheets

US 7,662,291 B2

CANISTER FOR TREATMENT OF CONTAMINATED FLUIDS

RELATED U.S. APPLICATION(S)

This application claims priority to U.S. Provisional Patent Application Ser. No. 60/787,949, filed Mar. 31, 2006, which application is hereby incorporated herein by reference.

TECHNICAL FIELD

The present invention relates to an apparatus and method for treatment of contaminated fluids, and more particularly, to a filtering apparatus having a material made from self-assembled monolayers on mesoporous supports for use in the removal of heavy metals from contaminated fluids.

BACKGROUND ART

Produced fluid, such as water, from offshore oil platforms can contain toxic heavy metals, for instance, mercury. In the Gulf of Mexico, mercury levels rarely exceed 100 parts per billion (ppb). However, in the Gulf of Thailand, the average concentration of mercury in produced water can range from about 200 ppb to about 2,000 ppb.

Discharge of mercury into the marine environment in U.S. territorial waters is currently regulated by the U.S. Environmental Protection Agency (EPA) under the Clean Water Act via the National Pollutant Discharge Elimination System permit process. According to environmental standards under 40 CFR § 131.36 for marine environment, limits include about 1800 ppb for acute exposure and about 25 ppb for chronic exposure. International standards for mercury discharges in produced water, on the other hand, range from about 5 ppb in Thailand to about 300 ppb in the North Sea.

Produced water often contains oil that was removed with the water during the bulk oil/water separation process. As an example, the produced water from the North Sea fields contains about 15-30 parts per million (ppm) dispersed oil with benzene, toluene, ethylbenzene, and xylene (BTEX); naphthalene, phenanthrene, dibenzothiophene (NPD), polycyclic aromatic hydrocarbon (PAH), phenol, and organic acid concentrations ranging from about 0.06 ppm to about 760 ppm. Additionally, these produced waters contain toxic heavy metals, such as mercury, cadmium, lead, and copper in concentrations ranging from less than about 0.1 ppb to about 82 ppb. The presence of a complex mix of constituents coupled with a high concentration of dissolved salts can present a challenge for heavy metal removal using currently available conventional technologies.

In particular, existing technologies for metal and mercury removal from diluted wastewater include activated carbon adsorption, sulfur-impregnated activated carbon, microemulsion liquid membranes, ion exchange, and colloid precipitate flotation. These technologies may not suitable for water treatment because of poor metal loading (e.g., metal uptake less than 20% of the mass of the adsorber material) and selectivity, (interference from other abundant ions in groundwater). In addition, mercury may be present in species other than elemental. So the method must be able to remove these other species, such as methyl mercury, etc. Furthermore, they lack stability for metal-laden products so that they are not disposable directly as a permanent waste form. As a result, secondary treatment is required to dispose or stabilize the separated mercury or the mercury-laden products. Mercury removal from non-aqueous sludge, adsorbed liquids, or partially- or fully-stabilized sludges, and mercury-contaminated soil is difficult because (1) the non-aqueous nature of some wastes prevents the easy access of leaching agents, (2) some waste streams with large volumes make the thermal desorption process expensive, and (3) the treatment of some waste streams are technically difficult because of the nature of the wastes.

Mercury removal from offgas in vitrifiers and in mercury thermal desorption processes is usually accomplished through activated carbon adsorption. However, the carbon-based adsorbents are only effective enough to remove 75 to 99.9% of the mercury with a loading capacity equivalent to 1-20% of the mass of the adsorber material. A last step, mercury amalgamation using expensive gold, usually is needed to achieve the EPA air release standard. A carbon bed usually is used later in the offgas system, where the temperature is generally lower than 250° F. In the sulfur impregnated carbon process, mercury is adsorbed to the carbon, which is much weaker than the covalent bond formed with, for instance, surface functionalized mesoporous material. As a result, the adsorbed mercury needs secondary stabilization because the mercury-laden carbon does not have the desired long-term chemical durability due to the weak bonding between the mercury and activated carbon. In addition, a large portion of the pores in the active carbon are large enough for the entry of microbes to solubilize the adsorbed mercury-sulfur compounds. The mercury loading is limited to about 0.2 g/g of the materials.

The microemulsion liquid membrane technique uses an oleic acid microemulsion liquid membrane containing sulfuric acid as the internal phase to reduce the wastewater mercury concentration from about 460 ppm to about 0.84 ppm. However, it involves multiple steps of extraction, stripping, demulsification, and recovery of mercury by electrolysis and uses large volumes of organic solvents. The liquid membrane swelling has a negative impact on extraction efficiency.

The slow kinetics of the metal-ion exchanger reaction requires long contacting times. This process also generates large volumes of organic secondary wastes. One ion exchange process utilizes Duolite™ GT-73 ion exchange organic resin to reduce the mercury level in wastewater from about 2 ppm to below about 10 ppb. Oxidation of the resin results in substantially reduced resin life and an inability to reduce the mercury level to below the permitted level of less than about 0.1 ppb. The mercury loading is also limited because the high binding capacity of most soils to mercury cations makes the ion-exchange process ineffective, especially when the large amounts of $Ca^{2+}$ from soil saturate the cation capacity of the ion exchanger. In addition, the mercury-laden organic resin does not have the ability to resist microbe attack. Thus, mercury can be released into the environment if it is disposed of as a waste form. In addition to interference from other cations in the solution besides the mercury-containing ions, the ion exchange process is simply not effective in removing neutral mercury compounds, such as $HgCl_2$, $Hg(OH)_2$, and organic mercury species, such as methylmercury, which is the most toxic form of mercury. This ion-exchange process is also not effective in removing mercury from non-aqueous solutions and adsorbing liquids.

The reported removal of metal from water by colloid precipitate flotation reduces mercury concentration from about 160 ppb to about 1.6 ppb. This process involves the addition of HCl to adjust the wastewater to pH 1, addition of $Na_2S$ and oleic acid solutions to the wastewater, and removal of colloids from the wastewater. In this process, the treated wastewater is potentially contaminated with the $Na_2S$, oleic acid, and HCl. The separated mercury needs further treatment to be stabilized as a permanent waste form.

Acidic halide solution leaching and oxidative extractions can also be used in mobilizing mercury in soils. For example $KI/I_2$ solutions enhance dissolution of mercury by oxidization and complexation. Other oxidative extractants based on hypochlorite solutions have also been used in mobilizing mercury from solid wastes. Nevertheless, no effective treatment technology has been developed for removing the mercury contained in these wastes. Since leaching technologies rely upon a solubilization process wherein the solubilized target (e.g. mercury) reaches a dissolution/precipitation equilibrium between the solution and solid wastes, further dissolution of the contaminants from the solid wastes is prevented once equilibrium is reached. In addition, soils are usually a good target ion absorber that inhibits the transfer of the target ion from soils to solution.

The removal of mercury from nonaqueous liquids, adsorbed liquids, soils, or partially-or-fully-stabilized sludge at prototypic process rates has been lacking. This is mainly because the mercury contaminants in actual wastes are much more complicated than the mercury systems addressed by many laboratory-scale tests that are usually developed based on some simple mercury salts. The actual mercury contaminants in any actual wastes almost always contain inorganic mercury (e.g., divalent cation $Hg^{2+}$, monovalent $Hg_2^{2+}$, and neutral compounds such as $HgCl_2$, $Hg[OH]_2$,); organic mercury, such as methylmercury (e.g., $CH_3\ HgCH_3$ or $CH_3\ Hg^+$) as a result of enzymatic reaction in the sludge; and metallic mercury, because of reduction. Since many laboratory technologies are developed for only one form of mercury, demonstrations using actual wastes are not be successful.

Other metals that are of interest for remediation and industrial separations include but are not limited to silver, lead, uranium, plutonium, neptunium, americium, cadmium and combinations thereof. Present methods of separation include but are not limited to ion exchangers, precipitation, membrane separations, and combinations thereof. These methods usually have the disadvantages of low efficiencies, complex procedures, and high operation costs.

Accordingly, it would be advantageous to provide an apparatus and method that can be used to remove heavy metals, such as mercury, cadmium, and lead from complex waste fluids, such as produced water, in a significant amount and in a cost effective manner.

SUMMARY OF THE INVENTION

The present invention, in one embodiment, provides an apparatus for use in the treatment of contaminated fluid. The apparatus, in an embodiment, includes an outer element into which contaminated fluid flows. The apparatus also includes an inner element positioned in substantial axial alignment within the outer element and in spaced relations thereto. The inner element may, in one embodiment, be substantially tubular in shape so that it can be concentrically positioned within a similarly shaped outer element. The apparatus further includes, between its ends, a pathway defined by an interior surface of the inner element and along which treated fluid may be directed out from the apparatus. The apparatus can further include a waste adsorbent material, positioned between the outer element and the inner element, for use in removing contaminants within the fluid flowing through the apparatus. The adsorbent material, in an embodiment, may be a nanosorbent material manufactured from self-assembled monolayers on mesoporous supports (SAMMS). To maintain the position of the inner element relative to that of the outer element, the apparatus may be provided with an upper end cap placed over both the inner element and the outer element at their top ends. An opposing lower end cap may similarly be placed over both the inner element and the outer element at their bottom ends. The lower end cap, however, may include an aperture in axial alignment with the pathway to permit treated fluid to exit the apparatus.

The present invention, in another embodiment, provides a method of manufacturing an apparatus for use in the treatment of contaminated fluid. The method includes providing an outer element substantially permeable to fluid flow. Next, an inner element defining a pathway extending between its ends may be positioned in substantial axial alignment within the outer element and in spaced relations thereto. The position of the inner element relative to the position of the outer element may thereafter be secured, for instance, by placing a substantially solid upper end cap over the outer and inner elements at their top ends and a substantially solid lower end cap over the outer and inner elements at their bottom end. Subsequently, a waste adsorbent material may be added to a space between the inner and outer elements. It should be noted that, in an alternate embodiment, the adsorbent material may be added to the space between the inner and outer elements prior to the lower end cap being secured to the bottom ends of the inner and outer elements.

The present invention further provides a method for treatment of contaminated fluid. The method includes providing an apparatus having an outer element, an inner element positioned in substantial axial alignment within the outer element and in spaced relations thereto, an adsorbent material, disposed between the outer element and the inner element, for use in removing contaminants within the fluid flowing across the outer element into the apparatus, and a pathway defined by an interior surface of the inner element and extending between ends of the inner element to direct treated fluid out from the apparatus. Next, the apparatus may be secured along a desired orientation. The apparatus may then be immersed within a flow of contaminated fluid. Thereafter, the contaminated fluid may be directed to flow across outer element, so that contaminants of a certain size can be removed. The fluid may be permitted to continue to flow from the outer element across the adsorbent material, so that certain contaminants can be removed from the fluid flow. In an embodiment, heavy metal contaminants, such as arsenic and/or mercury may be adsorbed by the adsorbent material for removal. Next, the fluid treated from the adsorbent material can be allowed to move across the inner element and into the pathway where the treated fluid may be guided along the pathway and out of the apparatus for collection.

DESCRIPTION OF SPECIFIC EMBODIMENTS

Figure 1:
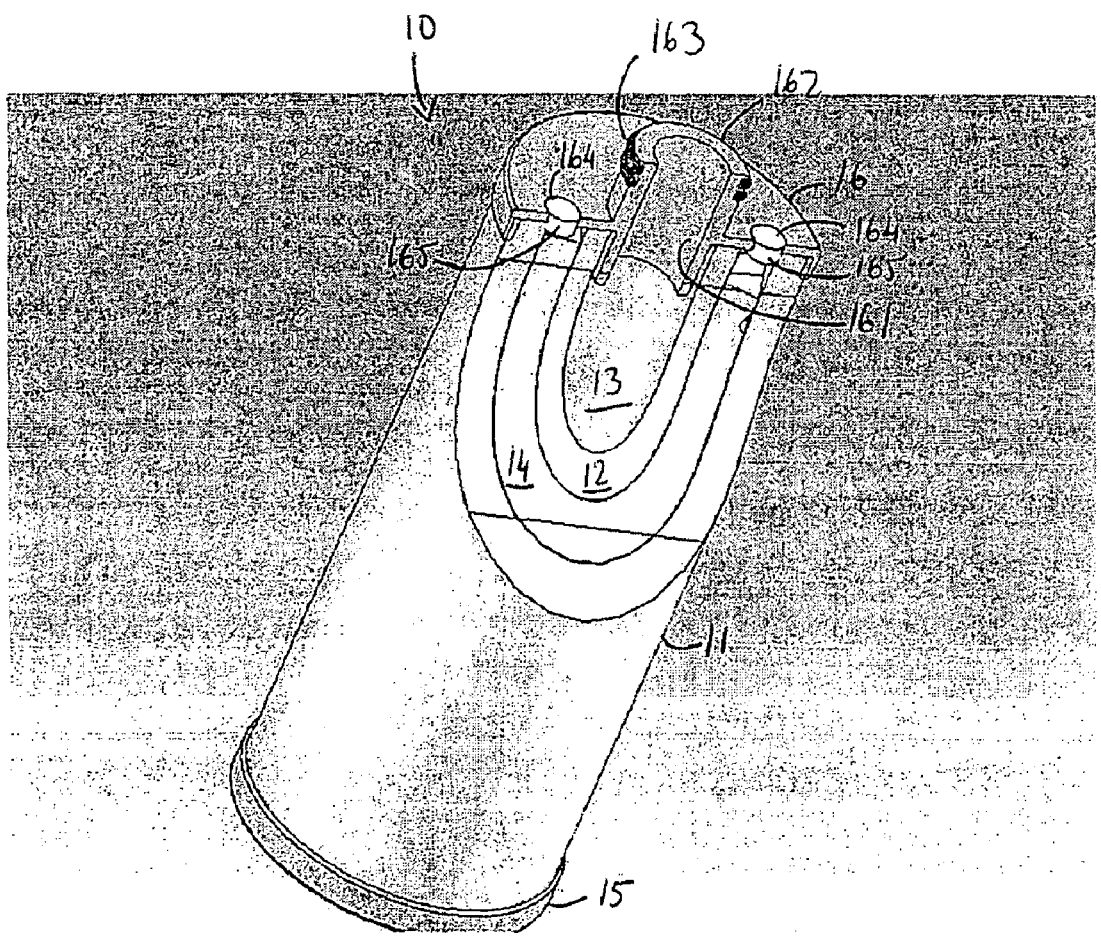
FIG. 1 illustrates an apparatus for use in the treatment of contaminated fluids in accordance with one embodiment of the present invention.

With reference to FIG. 1, the present invention provides, in one embodiment, an apparatus 10 through which contaminated fluid may be directed for subsequent removal of contaminants within the fluid therefrom.

Fluids which may be treated in connection with the present invention may be viscous, such as oil, or non-viscous, such as a liquid or a gas. Contaminants that may be removed by the system of the present invention includes heavy metals, such as mercury, cadmium, arsenic, and lead from complex fluids or waste streams, such as produced water, and mercury from a variety of waste solutions and contaminated waste oils.

The apparatus 10, in an embodiment, includes an outer element 11 designed for removing certain contaminants, for instance, solid and liquid contaminants, from the fluid flow. To that end, the outer element 11 may be made from a fluid permeable material, such as a synthetic material, e.g., polyester, polypropylene, nylon, metal, metal alloy, or a combination thereof, to permit fluid to flow thereacross in a direction indicated by arrows A. Other materials from which the outer element may be made include inorganic components, like fiberglass or ceramic, microglass, melt-blown, micron synthetic, organic cellulose, paper etc. or a combination thereof. An example of such an outer element is disclosed in U.S. Pat. No. 5,827,430, entitled Coreless and Spirally Wound Non-Woven Filter Element, and method of making such a filter element is disclosed in U.S. Pat. No. 5,893,956, entitled Method of Making a Filter Element. Both of these patents are hereby incorporated herein by reference. Alternatively, the outer element 11 may simply be a mesh or a fluid permeable material made from for instance, metals or metal alloys designed for containment of inner components of the apparatus and may not necessarily for filtering purposes.

In an embodiment, the outer element 11, may be substantially tubular in shape and may be provided with a diameter (i.e., Outside Diameter (OD) of apparatus 10) ranging from about from 3 inches to about 6 inches. In large part, the OD may be determined by the permeability of a waste adsorbent material used in connection with apparatus 10, which can determine the allowable flux rate through the apparatus and the differential pressure across the outer element 11. Alternatively, it may be necessary to provide the outer element 11 with a smaller OD should the waste adsorbent material be lower in its permeability. A description of the adsorbent material is provided hereinafter in detail. In addition, outer element 11 of apparatus 10, in an embodiment, may be provided with a thickness ranging from about 0.25 inch to about 1 inch. Of course, the OD, thickness, and other size related dimensions of the outer element 11 may be varied depending on the particular application, and the environment within which the apparatus 10 is used.

The apparatus 10 may also include an inner element 12 positioned in substantial axial alignment within the outer element 11 and in spaced relations thereto. The inner element 12, in one embodiment, may be substantially tubular in shape, such that it may be positioned substantially concentrically within outer element 11. The inner element 12 may also be similar in make up to outer element 11. To that end, the inner element 12 may be manufactured from a permeable material, such as polyester, polypropylene, nylon, metal, metal alloy, other similar synthetic material, or a combination thereof. Other materials from which the outer element may be made include inorganic components, like fiberglass or ceramic, microglass, melt-blown, micron synthetic, organic cellulose, paper etc. or a combination thereof. Alternatively, the inner element 12, may simply be a mesh or fluid permeable material made from for instance, metals or metal alloys.

To permit substantial concentric placement within the outer element 11 and in spaced relations thereto, the inner element 12 may be provide, in an embodiment, with a diameter (i.e., Inner Diameter (ID) of apparatus 10) ranging from about 1 inch to about 1.5 inches. Furthermore, the inner element 12 may be provided a thickness ranging from about 0.125 inch to about 0.75 inch. As with the outer filter 11, the ID, thickness, and other size related dimensions of the inner element 12 may be varied according to the size of the outer element 11, the environment within which the apparatus 10 is used, and the application.

The inner element 12, as shown in FIG. 1, may have extended between its ends, a pathway 13, defined by an interior surface 121 of the inner element 12. Pathway 13 provides a conduit along which treated fluid may be guided or directed out from the apparatus 10 in a direction substantially transverse, e.g., perpendicularly, to the flow of fluid into the apparatus 10.

Although the outer and inner elements 11 and 12 may be provided in the manner and with the materials set forth above, it should be appreciated that similar functionality may be obtained using other depth media, such as meltblown, spunbond, or fiberglass. Moreover, instead of being tubular in shape, the elements 11 and 12 may be provided with any geometric shape, so long as inner element 12 may be in substantial axial alignment within outer element 11.

Apparatus 10 further includes an adsorbent material 14, positioned between the outer element 11 and the inner element 12, for use in removing contaminants, for example, adsorbing heavy metals similar to those disclosed above, within the fluid flowing across the outer element 11 and within the apparatus 10. It should be appreciated that placement of the adsorbent material 14 between the elements 11 and 12 can help in containing and retaining the adsorbent material 14 within apparatus 10. The adsorbent material 14, in an embodiment, may be a nanosorbent material (i.e., adsorbent nanomaterial) manufactured from self-assembled monolayers on mesoporous supports (SAMMS). It should be appreciated that reference to the term "adsorbent material" hereinafter includes nanosorbent material or adsorbent nanomaterial, either of which may be used interchangeably with the other. The mesoporous supports, in an embodiment, may be made from various porous materials, including silica. An example of a SAMMS material that can be used in connection with apparatus 10 of the present invention includes thiol-SAMMS, such as that disclosed in U.S. Pat. No. 6,326,326, which patent is hereby incorporated herein by reference.

In accordance with one embodiment of the present invention, the adsorbent material 14 may include porous particles ranging from about 5 microns to about 200 microns in size. In an embodiment, the particles, on average, range from about 50 microns to about 80 microns in size, include a pore size ranging from about 2 nanometers (nm) to about 7 nm, and may be provided with an apparent density of ranging from about 0.2 grams/milliliter to about 0.4 grams/milliliter. Due to the size of the adsorbent material 14, it should be noted that each of the outer and inner elements 11 and 12 may be designed with a porosity that can limit the permeability of each element to the adsorbent material, so as to minimize movement of the adsorbent material across the elements 11 and 12.

Although the adsorbent material is disclosed above as being manufactured from SAMMS, it should be appreciated that other adsorbent materials may be used, so long as these adsorbent materials can act to remove contaminants from the fluid flow. One example of an alternate adsorbent material includes commercially carbon particles ranging from about 8 to about 30 mesh in size.

To maintain the position of the inner element 12 relative to that of the outer element 11, apparatus 10 may be provided with an upper end cap 15 positioned over both the inner element 12 and the outer element 11 at their top ends. In one embodiment, the upper cap 15 may be a substantially solid cap, so as to prevent fluid within pathway 13 from flowing through a top end of apparatus 10.

Still referring to FIG. 1, an opposing lower end cap 16 may similarly be placed over both the inner element 12 and the outer element 11 at their bottom ends. The lower cap 16, however, may include an aperture 161 in axial alignment with the pathway 13 to permit treated fluid to exit the apparatus 10. Lower cap 16, in an embodiment, may be fitted with an engagement mechanism 162 extending from aperture 161. Engagement mechanism 162, as shown in FIG. 1, permits apparatus 10 to securely engage a substantially complementary passageway 25 within a vessel 20 (see FIG. 2) designed to direct the flow of contaminated fluid into apparatus 10 and across the outer element 11, adsorbent material 14, inner element 12 and into pathway 13. Such as vessel can be commercially obtained through Perry Equipment Corporation in Mineral Wells, Tex. To permit a substantially fluid tight engagement between the mechanism 162 and complementary passageway 25, a seal 163, such as an O-ring, may be provided on the engagement mechanism 162. Of course, more than one O-ring may be used, as illustrated in FIG. 1, if necessary or desired.

Lower cap 16 may also include at least one opening 164 through which the adsorbent material 14 may be directed into the apparatus 10 between the elements 11 and 12. A cover 165 may be provided to seal the opening 164 and to prevent leakage of the adsorbent material 14 from the apparatus 10. Although illustrated as being part of the lower cap 16, it should be noted that opening 164 may instead be provided as part of upper cap 15 or may also be provided as part of upper cap 15.

The top end cap 15 and lower end cap 16, in an embodiment, may be manufactured from a rigid material. Examples of such a rigid material includes, metals, plastics, or other synthetic material, such as polyester, polypropylene or nylon.

In manufacturing apparatus 10 of the present invention, the outer element 11 and inner element 12 may initially be made in accordance with the protocol provided in U.S. Pat. Nos. 5,827,430 and 5,893,956 noted above. Thereafter, the inner and outer elements 11 and 12 may be cut to a desirable length. In one embodiment, the length may range from about 4 to about 5 feet long. Of course, other lengths may be used depending on the application that is being carried out.

The upper cap 15 and lower cap 16 may also be provided through an injection molding process, a well known process in the art. Once available, the upper cap 15, in an embodiment, may be secured in a device, such as a capper (not shown), so as to expose its inner surface. The upper cap 15 may then be heated using, for instance, radiant heat or some other method, to bring the temperature of the upper cap 15 to near its melting temperature.

The outer element 11 and its concentrically positioned inner element 12 may next have their top ends placed in contact with the bottom side of the softened upper cap 15. Thereafter, in an embodiment, using pressure, the outer and inner elements 11 and 12 may be pressed into the inner surface of the upper cap 15, so that a substantially permanent joint and seal may be created between the elements 11 and 12, and the upper cap 15.

Once in the upper cap 15 is in place, the lower cap 16 may be secured in the capper device (not shown) where, in an embodiment, it may be heated using, for instance, radiant heat or other methods to bring the temperature of the lower cap 16 to near its melting temperature. The concentrically positioned elements 11 and 12 may subsequently have the ends opposite that of the upper cap 15 be pressed into a inner surface of the lower cap 16, so that a substantially permanent joint and seal may be created between the elements 11 and 12, and the lower cap 16. Of course other processes can be used to create a seal between the caps 15 and 16 and the elements. For instance, the caps may be designed to be a screw-on cap to permit their removal should the interior of the apparatus 10 need to be accessed.

Thereafter, the assembled apparatus 10 may be permitted to cool, and the adsorbent material 14 (i.e., functionalized thiol-SAMMS) may be added to the element through opening 164 in one of the end caps. Vibration and other techniques may be used to ensure that the area between the elements 11 and 12 is completely filled. In one embodiment, the upper and lower end caps 15 and 16 may be provided with a seal to ensure that the adsorbent material 14 remains sealed within apparatus 10, such that no internal bypass can occur.

Once filled, the opening 164 may be closed with cover 165 and sealed.

Alternatively, a plug made from synthetic material similar to the end caps 15 and 16 may be heated and placed in the opening 164, a melted liquid synthetic material may be poured into the opening 164, or a sealant, such as, urethane may be injected into the opening 164.

In an alternate embodiment, instead of filling the apparatus 10 with the adsorbent material 14 subsequent to the placement of the lower cap 16 onto the elements 11 and 12, the apparatus 10 may be filled with the adsorbent material 14 prior to the placement of the lower cap 16 onto the elements 11 and 12.

Figure 2:
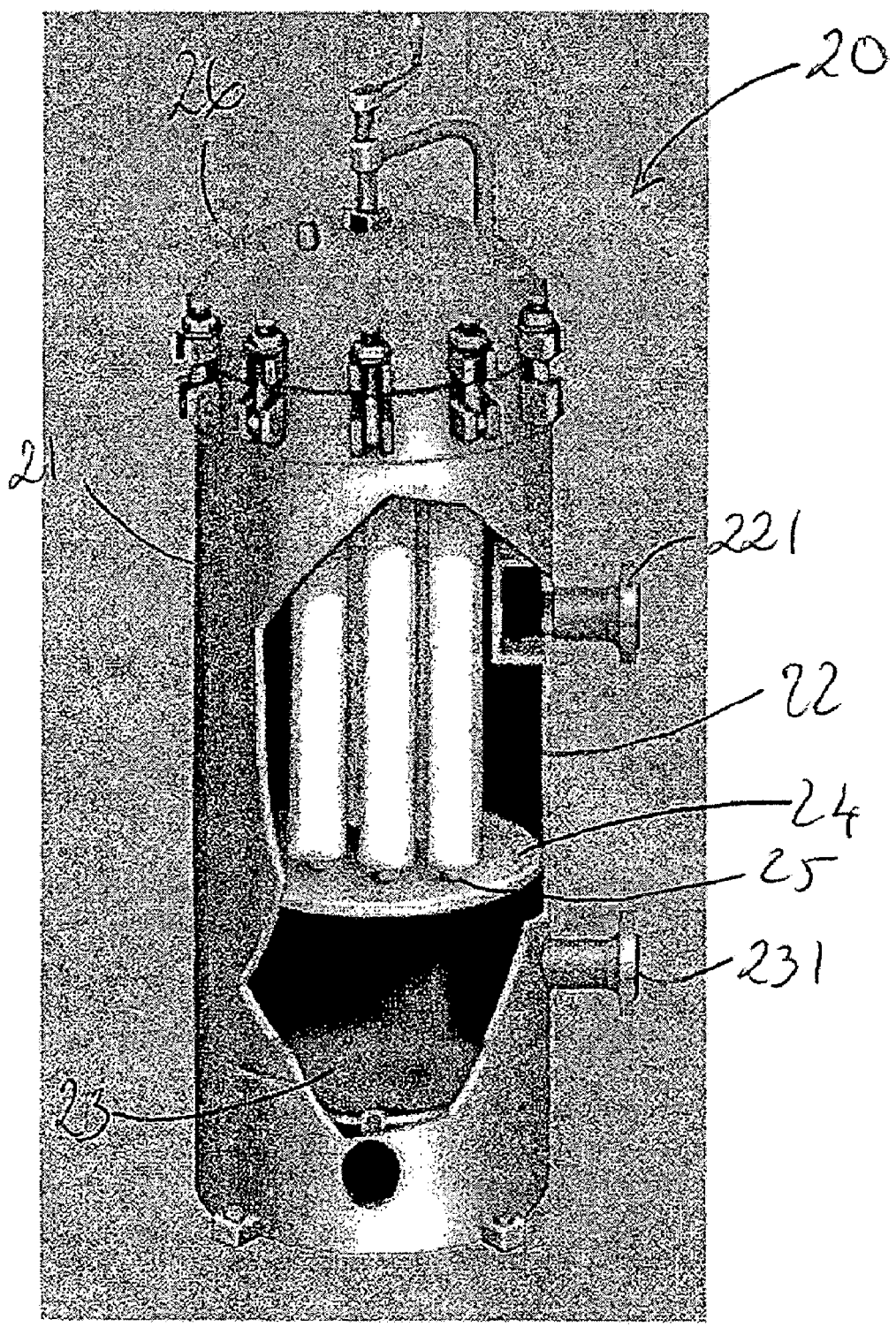
FIG. 2 illustrates a vessel for use with the apparatus shown in FIG. 1.

In operation, looking now at FIG. 2, in general, apparatus 10 may be placed within vessel 20, secure in a desired orientation, based on the location of passageway 25 in vessel 20, and subsequently be immersed in a flow of contaminated fluid to permit removal of contaminants by the elements and waste adsorbent material.

The vessel 20, in accordance with one embodiment of the present invention, includes a housing 21 within which the apparatus 10 may be accommodated. Housing 21, as illustrated in FIG. 2, includes an inlet chamber 22 and an outlet chamber 23 separated by a support plate 24. Support plate 24, in an embodiment, may be designed to include at least one passageway 25 to which the engagement mechanism 162 on the lower cap 16 of apparatus 10 may complementarily engage. Of course, a plurality of passageways 25 may be provided into which a complementary number of apparatus 10 may be securely placed. If desired, a plug or cover may be provided for those passageways 25 not in engagement with an apparatus 10. In an embodiment, the passageway 25 may be equipped with thimbles (not shown) which provide a location for seal 163 on engagement mechanism 162 to be made with the lower end cap 16. To facilitate placement of the apparatus 10 in secured engagement with the passageway 25 along a desired orientation within the inlet chamber 22, and/or removal of apparatus 10 therefrom, the vessel 20 may be provided with a sealable closure 26.

Figure 3:
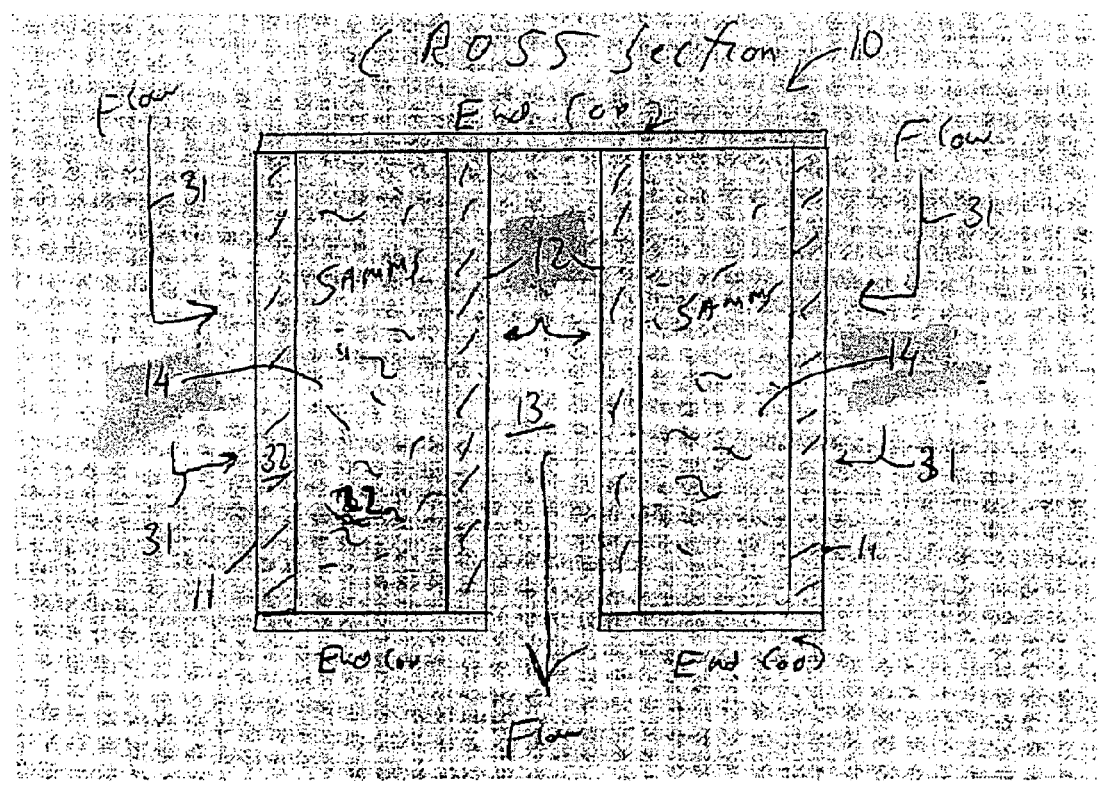
FIG. 3 illustrates a schematic diagram of fluid flow through the apparatus in FIG. 1.

After the apparatus 10 has been placed in secured engagement with passageway 25 along a desired orientation (i.e., the pathway 13 of the apparatus 10 being in substantial alignment with passageway 25), and the closure 26 of vessel 20 are sealed, contaminated fluid may be directed into the inlet chamber 22 through inlet 221. Once within the inlet chamber 22, contaminated fluid may immerse apparatus 10 and be directed to flow radially through the apparatus 10. In other words, looking now at FIG. 3, the contaminated fluid may initially flow into and across the outer element 11 in a direction substantially transverse, and more particularly substantially perpendicularly, to the pathway 13 and as illustrated by arrows 31. As the contaminated fluid flows across the outer element 11, it may be forced to flow through a tortuous path between fibrous matrix 32 within the outer element 11. While doing so solid contaminants may initially be trapped within the matrix 32 and removed from the fluid.

Once through the outer element 11, the fluid comes into contact with the adsorbent material 14 and continues to flow in a direction substantially transverse to pathway 13. In the presence of the adsorbent material 14, which in one embodiment, may be mesoporous SAMMS, fluid can be permitted to flow through the pores of the particles in the SAMMS material. Within these pores, particular contaminants, such as heavy metal (e.g., mercury) come in contact with a monolayer of chemical designed to attract and bind the molecules of these contaminants, along with the other constituents of the fluid flow. As such these particular contaminants may be trapped within the SAMMS and removed from the fluid flow.

The resulting treated fluid may next exit the adsorbent material 14 and move across the inner element 12 and into the pathway 13. Once in the pathway 13, the fluid flow changes direction and now moves in a direction substantially parallel to that of the pathway 13 (i.e., substantially transverse to the radial flow of the fluid across the elements). As it moves along pathway 13, the treated fluid gets directed through aperture 161 of lower end cap 16, across passageway 25, and into outlet chamber 23 of vessel 20, where the fluid can subsequently be directed out of the housing 21 through outlet 231.

It should be appreciated that the present invention also contemplates the apparatus 10 being used with a vessel where contaminated fluid may flow from within the apparatus 10 outward. In other words, contaminated fluid may be introduced initially through the aperture 161, up into the pathway 13 extending the length of apparatus 10, and directed radially outward through the inner element 12, across the adsorbent material 14, and out through outer element 11.

Once the adsorbent material 14 within the apparatus 10 becomes used up or spent, the vessel 20 may be taken out of service, the apparatus 10 removed, and a new apparatus 10 put in its place. To the extent desired, the spent adsorbent material 14 may be regenerated. In particular, the spent adsorbent material 14 may be treated with an acidic fluid to remove the adsorbed contaminant. After this regeneration process, the apparatus 10 may be put back in service to again remove the contaminant. In an embodiment of the invention, the regeneration process may be accomplished with the apparatus 10 in place in the vessel 20.

To determine when the adsorbent material 14 may be used up, several approaches may be implemented. In one approach, it is known that as the apparatus 10 becomes filled with contaminants, its differential pressure will increase. This is because contaminants in the fluid once trapped by the adsorbent material 14 will tend to plug the tightly packed adsorbent material over time. As such, it will be important to monitor the differential pressure of the apparatus 10. Moreover, although the primary purpose of the adsorbent material 14 is to adsorb a particular contaminant, due to its small size (i.e., from about 5 microns to about 150 microns), the adsorbent material 14 may also be a very good solids filter. This ability to filter solids can result in the adsorbent material be spent or plugged sooner than otherwise necessary. To that end, outer element 11 may be provided to filter the solid contaminants and to minimize the number of times the adsorbent material needs to be changed.

In another approach, the status of the adsorbent material 14 may be determined by periodically or continuously monitoring the level of contaminants of the treated fluid in the outlet stream. When the level in the outlet stream increases to a certain point, the apparatus 10 may be changed or regenerated.

Although shown in a vertical position, it should be appreciated that the vessel 20 may be designed to be in a horizontal position with fluid flow direction adapted to the change accordingly. Moreover, the vessel 20 as noted above, may be manufactured to accommodate a plurality of apparatus 10. In such an embodiment, each apparatus 10 may be designed to have a rated or allowable flow rate therethrough. In particular, the number of apparatuses used may be determined, for instance, by taking a total flow rate to be treated and dividing that by an allowable flow rate for one apparatus. The size of the vessel 20 may then be the size required to place this number of apparatuses 10 in close proximity in housing 21 of the vessel 20.

While the invention has been described in connection with the specific embodiments thereof, it will be understood that it is capable of further modification. Furthermore, this application is intended to cover any variations, uses, or adaptations of the invention, including such departures from the present disclosure as come within known or customary practice in the art to which the invention pertains.

What is claimed is:

1. An apparatus for treating contaminated fluid, the apparatus comprising:
    an outer element through which contaminated fluid flows;
    an inner element positioned in substantial axial alignment within the outer element;
    a plurality of porous waste adsorbent particles, each having nanometer-sized pores, the particles being disposed between the outer element and the inner element and designed to physically trap and remove contaminants nanoscale in size within the fluid flowing through the apparatus; and
    a pathway, defined by an interior surface of the inner element and capable of, in one instance, directing treated fluid exiting the inner element along the pathway and out from the apparatus and, in another instance, permitting fluid to be treated to flow into the apparatus and through the inner element, absorbent particles and outer element.

2. An apparatus as set forth in claim 1, wherein the outer element is made from a permeable material.

3. An apparatus as set forth in claim 1, wherein the outer element includes a fibrous matrix.

4. An apparatus as set forth in claim 3, wherein the fibrous matrix defines a substantially tortuous path through which the fluid flow passes.

5. An apparatus as set forth in claim 3, wherein the fibrous matrix acts to trap contaminants of a predetermined size.

6. An apparatus as set forth in claim 1, wherein the fibrous matrix is made from material including one of polyester, polypropylene, nylon, other polymeric materials, metal, metal alloy, fiberglass or ceramic, microglass, melt-blown, micron synthetic, organic cellulose, paper, or a combination thereof.

7. An apparatus as set forth in claim 1, wherein the outer element is designed to direct fluid flow substantially radially thereacross.

8. An apparatus as set forth in claim 1, wherein the outer element includes a radial thickness ranging from about 0.25 inch to about 1.0 inch.

9. An apparatus as set forth in claim 1, wherein the outer element is made from a metallic or metallic alloy mesh material.

10. An apparatus as set forth in claim 1, wherein the outer element is designed to permit fluid viscous in nature to flow thereinto.

11. An apparatus as set forth in claim 10, wherein the viscous fluid includes one of oils, waste oils, other fluid viscous in nature, or a combination thereof.

12. An apparatus as set forth in claim 1, wherein the outer element is designed to permit fluid non-viscous in nature to flow thereinto.

13. An apparatus as set forth in claim 12, wherein the non-viscous fluid includes a liquid or a gas.

14. An apparatus as set forth in claim 12, wherein the non-viscous fluid includes produced water.

15. An apparatus as set forth in claim 1, wherein the inner element is substantially tubular in shape and is concentrically disposed within a similarly shaped outer element.

16. An apparatus as set forth in claim 1, wherein the inner element is made from a permeable material.

17. An apparatus as set forth in claim 1, wherein the inner element is made from a synthetic material.

18. An apparatus as set forth in claim 17, wherein the synthetic material includes one of polyester, polypropylene, nylon, other polymeric materials, metal, metal alloy, fiberglass or ceramic, microglass, melt-blown, micron synthetic, organic cellulose, paper, or a combination thereof.

19. An apparatus as set forth in claim 1, wherein the inner element includes a radial thickness ranging from about 0.125 inch to about 0.75 inch.

20. An apparatus as set forth in claim 1, wherein the inner element is made from a metallic or metallic alloy mesh material.

21. An apparatus as set forth in claim 1, wherein the adsorbent particles are designed to remove heavy metals from the fluid flow.

22. An apparatus as set forth in claim 1, wherein the adsorbent particles are designed to removed one of mercury, silver, lead, uranium, plutonium, neptunium, americium, arsenic, cadmium, or a combination thereof.

23. An apparatus as set forth in claim 1, wherein the adsorbent particles include a porous particle made from self-assembled monolayers on mesoporous supports (SAMMS).

24. An apparatus as set forth in claim 23, wherein the particle is made from silica.

25. An apparatus as set forth in claim 23, wherein the particle has a pore size ranging from about 2 nanometers (nm) to about 7 nm.

26. An apparatus as set forth in claim 1, wherein the adsorbent particles include carbon particles ranging from about 8 to about 30 mesh in size.

27. An apparatus as set forth in claim 1, wherein the adsorbent material is designed to remove contaminants different than those removed by the outer element.

28. An apparatus as set forth in claim 1, wherein the pathway is designed to allow the treated fluid to flow therealong in a direction substantially transverse to a direction taken by the contaminated fluid across the outer element.

29. An apparatus as set forth in claim 1, further including an upper end cap positioned over both a top end of the inner element and a top end of the outer element, so as to maintain the position of the inner element relative to that of the outer element.

30. An apparatus as set forth in claim 29, wherein the upper end cap is made from a substantially solid material, so as to minimize fluid flow from within the pathway therethrough.

31. An apparatus as set forth in claim 30, wherein the solid material includes one of metals, plastics, polyester, polypropylene, nylon, other synthetic materials, or a combination thereof.

32. An apparatus as set forth in claim 1, further including a lower end cap positioned over both a bottom end of the inner element and a bottom end of the outer element.

33. An apparatus as set forth in claim 32, wherein the lower end cap includes an aperture in substantial alignment with the pathway to permit treated fluid to exit therefrom.

34. An apparatus as set forth in claim 33, wherein the lower end cap further includes an engagement mechanism extending from the aperture to permit secure engagement of the apparatus within a fluid treatment vessel.

35. An apparatus as set forth in claim 32, wherein the lower end cap further includes an opening through which the adsorbent particles can be directed into the apparatus between the outer element and the inner element.

36. An apparatus as set forth in claim 32, wherein the lower end cap is made from a material including metals, plastics, polyester, polypropylene, nylon, other synthetic materials, or a combination thereof.

37. An apparatus for treating contaminated fluid, the apparatus comprising:
an outer element into which contaminated fluid flows, the outer element being made from a metallic or metallic alloy mesh material;
an inner element positioned in substantial axial alignment within the outer element;
a waste adsorbent material disposed between the outer element and the inner element for removing certain contaminants within the fluid flowing into the apparatus and across the outer element; and
a pathway, defined by an interior surface of the inner element, along which treated fluid exiting the inner element into the pathway can be directed out from the apparatus.

38. An apparatus for treating contaminated fluid, the apparatus comprising:
an outer element into which contaminated fluid flows;
an inner element positioned in substantial axial alignment within the outer element, the inner element being made from a metallic or metallic alloy mesh material;
a waste adsorbent material disposed between the outer element and the inner element for removing certain contaminants within the fluid flowing into the apparatus and across the outer element; and
a pathway, defined by an interior surface of the inner element, along which treated fluid exiting the inner element into the pathway can be directed out from the apparatus.

39. An apparatus for treating contaminated fluid, the apparatus comprising:
an outer element into which contaminated fluid flows;
an inner element positioned in substantial axial alignment within the outer element, the inner element being made from a metallic or metallic alloy mesh material;
a waste adsorbent material disposed between the outer element and the inner element for removing certain contaminants within the fluid flowing into the apparatus and across the outer element, the waste adsorbent material including a porous particle made from self-assembled monolayers on mesoporous supports (SAMMS); and
a pathway, defined by an interior surface of the inner element, along which treated fluid exiting the inner element into the pathway can be directed out from the apparatus.

40. An apparatus as set forth in claim 39, wherein the particle is made from silica.

41. An apparatus as set forth in claim 39, wherein the particle has a pore size ranging from about 2 nanometers (nm) to about 7 nm.

42. An apparatus for treating contaminated fluid, the apparatus comprising:
an outer element into which contaminated fluid flows;

an inner element positioned in substantial axial alignment within the outer element, the inner element being made from a metallic or metallic alloy mesh material;

a waste adsorbent material disposed between the outer element and the inner element for removing certain contaminants within the fluid flowing into the apparatus and across the outer element, the waste adsorbent material including carbon particles ranging from about 8 to about 30 mesh in size; and a pathway, defined by an interior surface of the inner element, along which treated fluid exiting the inner element into the pathway can be directed out from the apparatus.

43. An apparatus for treating contaminated fluid, the apparatus comprising:

an outer element into which contaminated fluid flows;

an inner element positioned in substantial axial alignment within the outer element;

a waste adsorbent material disposed between the outer element and the inner element for removing certain contaminants within the fluid flowing into the apparatus and across the outer element;

a pathway, defined by an interior surface of the inner element, along which treated fluid exiting the inner element into the pathway can be directed out from the apparatus; and a lower end cap positioned over both a bottom end of the inner element and a bottom end of the outer element, the lower end cap including (i) an aperture in substantial alignment with the pathway to permit treated fluid to exit therefrom, and (ii) an engagement mechanism extending from the aperture to permit secure engagement of the apparatus within a fluid treatment vessel.

44. An apparatus as set forth in claim 43, wherein the lower end cap further includes an opening through which the adsorbent material can be directed into the apparatus between the outer element and the inner element.

45. An apparatus for treating contaminated fluid, the apparatus comprising:

an outer element into which contaminated fluid flows, the outer element being made from a metallic or metallic alloy mesh material;

an inner element positioned in substantial axial alignment within the outer element;

a plurality of porous waste adsorbent particles, each having nanometer-sized pores, the particles being disposed between the outer element and the inner element and designed to physically trap and remove contaminants nanoscale in size within the fluid flowing into the apparatus and across the outer element; and a pathway, defined by an interior surface of the inner element, along which treated fluid exiting the inner element into the pathway can be directed out from the apparatus.

46. An apparatus for treating contaminated fluid, the apparatus comprising:

an outer element into which contaminated fluid flows;

an inner element positioned in substantial axial alignment within the outer element, the inner element being made from a metallic or metallic alloy mesh material;

a plurality of porous waste adsorbent particles, each having nanometer-sized pores, the particles being disposed between the outer element and the inner element and designed to physically trap and remove contaminants nanoscale in size within the fluid flowing into the apparatus and across the outer element; and a pathway, defined by an interior surface of the inner element, along which treated fluid exiting the inner element into the pathway can be directed out from the apparatus.

47. An apparatus for treating contaminated fluid, the apparatus comprising:

an outer element into which contaminated fluid flows;

an inner element positioned in substantial axial alignment within the outer element;

a plurality of porous waste adsorbent particles, each having nanometer-sized pores, the particles being disposed between the outer element and the inner element and designed to physically trap and remove contaminants nanoscale in size within the fluid flowing into the apparatus and across the outer element, the waste adsorbent particles include a porous particle made from self-assembled monolayers on mesoporous supports (SAMMS); and a pathway, defined by an interior surface of the inner element, along which treated fluid exiting the inner element into the pathway can be directed out from the apparatus.

48. An apparatus as set forth in claim 47, wherein the particle is made from silica.

49. An apparatus as set forth in claim 47, wherein the particle has a pore size ranging from about 2 nanometers (nm) to about 7 nm.

50. An apparatus for treating contaminated fluid, the apparatus comprising:

an outer element into which contaminated fluid flows;

an inner element positioned in substantial axial alignment within the outer element, the inner element being made from a metallic or metallic alloy mesh material;

a plurality of porous waste adsorbent particles, each having nanometer-sized pores, the particles being disposed between the outer element and the inner element and designed to physically trap and remove contaminants nanoscale in size within the fluid flowing into the apparatus and across the outer element, the waste adsorbent particles include carbon particles ranging from about 8 to about 30 mesh in size; and a pathway, defined by an interior surface of the inner element, along which treated fluid exiting the inner element into the pathway can be directed out from the apparatus.

51. An apparatus for treating contaminated fluid, the apparatus comprising:

an outer element into which contaminated fluid flows;

an inner element positioned in substantial axial alignment within the outer element;

a plurality of porous waste adsorbent particles, each having nanometer-sized pores, the particles being disposed between the outer element and the inner element and designed to physically trap and remove contaminants nanoscale in size within the fluid flowing into the apparatus and across the outer element;

a pathway, defined by an interior surface of the inner element, along which treated fluid exiting the inner element into the pathway can be directed out from the apparatus; and a lower end cap positioned over both a bottom end of the inner element and a bottom end of the outer element, the lower end cap including (i) an aperture in substantial alignment with the pathway to permit treated fluid to exit therefrom, and (ii) an engagement mechanism extending from the aperture to permit secure engagement of the apparatus within a fluid treatment vessel.

52. An apparatus as set forth in claim 50, wherein the lower end cap further includes an opening through which the adsorbent particles can be directed into the apparatus between the outer element and the inner element.

* * * * *